United States Patent
Fischer et al.

(10) Patent No.: US 7,197,631 B1
(45) Date of Patent: Mar. 27, 2007

(54) SYSTEM AND METHOD FOR CONSTRUCTING A USER APPLICATION'S ADVANCED CONFIGURATION AND POWER INTERFACE (ACPI) NAMESPACE

(75) Inventors: Matthew Fischer, Plano, TX (US); Benjamin Preston, Albuquerque, NM (US); Raghuram Kota, Plano, TX (US); Ajay Joshi, Richardson, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 661 days.

(21) Appl. No.: 10/329,198

(22) Filed: Dec. 23, 2002

(51) Int. Cl.
*G06F 9/00* (2006.01)
*G06F 7/00* (2006.01)
(52) U.S. Cl. .................. 713/1; 713/2; 707/100
(58) Field of Classification Search .......... 713/1, 713/2; 707/100, 101, 102, 201; 717/100; 714/44; 719/321; 710/8; 726/11
See application file for complete search history.

(56) References Cited

U.S. PATENT DOCUMENTS 4,868,743 A * 9/1989 Nishio ..................... 707/3
5,903,894 A * 5/1999 Reneris ................. 707/100
5,999,730 A * 12/1999 Lewis .................... 717/109
6,108,786 A * 8/2000 Knowlson ................ 726/11
6,185,677 B1 * 2/2001 Nijhawan ................. 713/2

OTHER PUBLICATIONS

"Advanced Configuration and Power Interface Specification"; Revision 2.0a; Compaq Computer Corporation, Intel Corporation, Microsoft Corporation, Phoenix Technologies Ltd. and Toshiba Corporation; Mar. 31, 2002; 500 pages.
"ACPI Component Architecture Programmer Reference"; Revision 1.13; Core Subsystem, Debugger and Utilities; Intel; May 3, 2002; 154 pages.
"iASL Compiler User Reference"; Revision 1.01; Intel; May 3, 2002; 10 pages.

* cited by examiner

*Primary Examiner*—Suresh Suryawanshi

(57) ABSTRACT

A system and method for constructing a user application's Advanced Configuration and Power Interface (ACPI) namespace in a computer platform employing an ACPI-compatible implementation is disclosed. A traversing function is operable to traverse a kernel ACPI namespace nodal tree and provide the name of the node of the tree to the user application's ACPI namespace. The traversing function may withhold a copy of a particular node if that node is a control method object not included in a list of safe control methods. Another embodiment provides a scheme for assisting a user application's access to a control method object.

14 Claims, 5 Drawing Sheets

SYSTEM AND METHOD FOR CONSTRUCTING A USER APPLICATION'S ADVANCED CONFIGURATION AND POWER INTERFACE (ACPI) NAMESPACE

BACKGROUND

The Advanced Configuration and Power Interface (ACPI) specification is a computer architecture-related standard developed to establish industry common interfaces for enabling robust operating system (OS)-directed motherboard device configuration and power management of both devices and entire platforms. The ACPI specification evolves the existing collection of power management BIOS code, Advanced Power Management (APM) Application Program Interfaces (APIs), Plug and Play Basic Input/Output System (PNPBIOS) APIs, and Multiprocessor Specification (MPS) tables, into a well-defined, integrated power management and configuration interface specification. From a manufacturing and implementation perspective, the ACPI specification enables different computer platforms to implement common motherboard configuration and power management functions. From a power management perspective, it promotes the concept that platforms should conserve energy by transitioning unused devices into lower power states. For example, computer platforms employing ACPI-compatible implementations are able to optimize processor clock speed, control motherboard and peripheral device power consumption, and place an entire computer platform into a low-power or sleeping state.

Centralizing power management and related directives in the OS has made it practical and compelling for operating software to support and exploit ACPI-defined interfaces. To implement ACPI-defined interfaces and take advantage of the functionality offered by them, operating software, such as user applications, is provided with global knowledge of, and unrestricted access to, what are known as control method objects. These control method objects interrogate and adjust system-level hardware states to enable the initiating software, whether OS or other operating software, to perform useful tasks ranging from reading a temperature to installing a new device.

The existing ACPI architecture, however, is not without limitations. For instance, providing user applications with global knowledge of control method objects and unrestricted access thereto can affect the safety, stability, and security of the computer platform. Some control method objects modify configuration registers or cause General Purpose Events (GPEs) which affect generic features of the computer platform, including value-added hardware. User applications, however do not have a system-wide awareness of which control method objects are being changed or executed by which components of the computer system. Accordingly, user applications may inadvertently invoke control method objects that cause firmware changes that the kernel cannot handle, corrupt data, or crash the entire system. Furthermore, frequent accesses to the kernel's ACPI namespace by a user application may negatively impact the performance of a computer system.

SUMMARY

A system and method for constructing a user application's Advanced Configuration and Power Interface (ACPI) namespace in a computer platform employing an ACPI-compatible implementation is disclosed. A traversing function is operable to traverse a kernel ACPI namespace nodal tree and provide the name of the node of the tree to the user application's ACPI namespace. The traversing function may withhold a copy of a particular node if that node is a control method object not included in a list of safe control methods. Another embodiment provides a scheme for restricting a user application's access to a control method object.

DETAILED DESCRIPTION OF THE DRAWINGS

Figure 1:
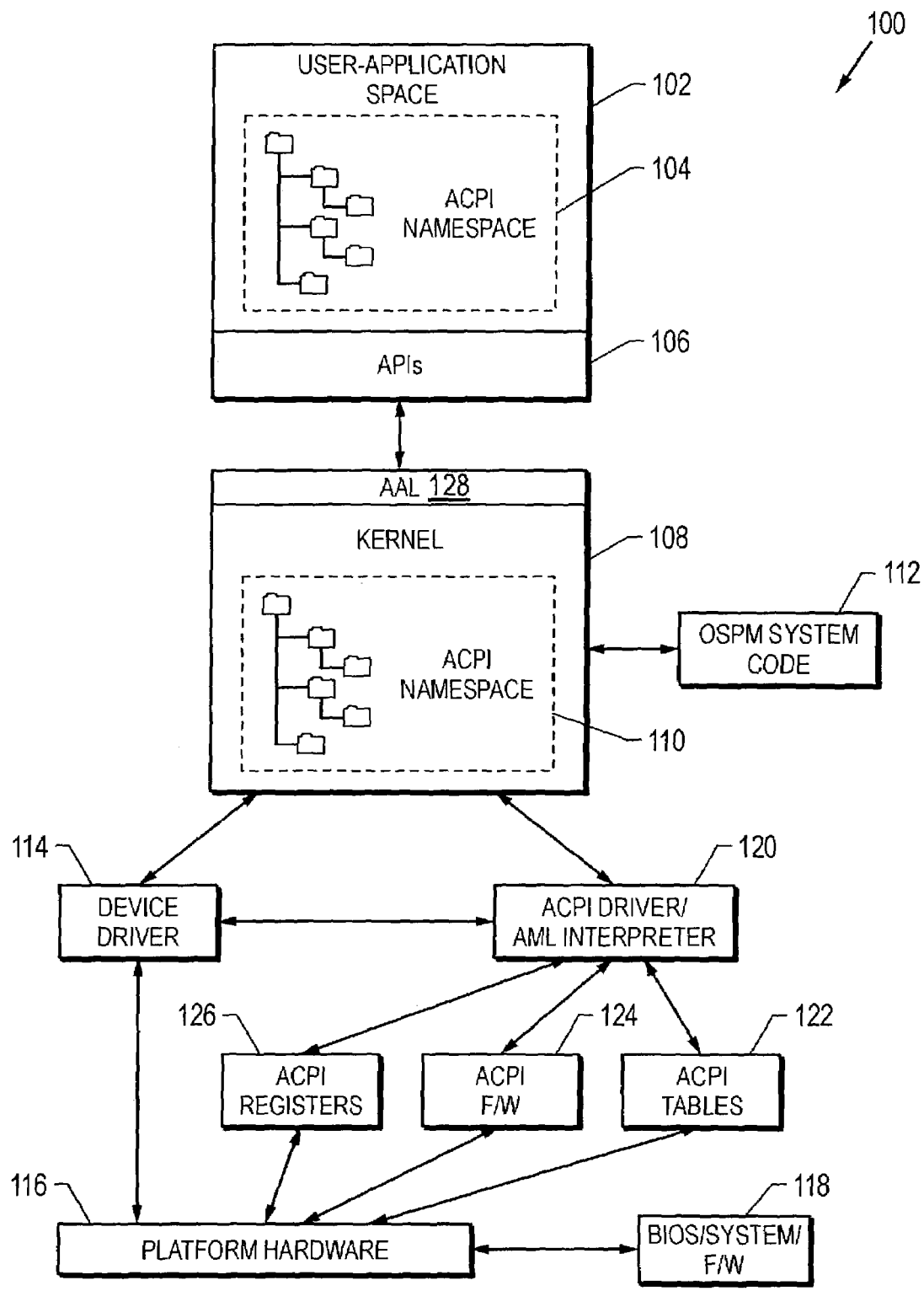
FIG. 1 depicts a functional block diagram of a computer platform having an ACPI-compatible implementation wherein a scheme for restricting user-space application access to the ACPI-namespace and ACPI methods is provided.

In the drawings, like or similar elements are designated with identical reference numerals throughout the several views thereof, and the various elements depicted are not necessarily drawn to scale. Referring now to FIG. 1, depicted therein is an embodiment of a computer platform 100 having an ACPI-compatible implementation wherein a scheme for restricting user-space application access to the ACPI namespace and ACPI methods is provided. A user-space application or user-application space 102 includes a database structure having a user-application ACPI namespace 104 and user software application programs that carry out various useful tasks. As will be discussed in more detail hereinbelow, the user-application ACPI namespace 104 is a "redacted" copy of an ACPI namespace 110 residing in an operating system (OS) kernel space 108 of the computer platform 100. Application Program Interfaces (APIs) 106 provide a set of formalized software calls and routines that can be referenced by the user applications in the user-application space 102 to access underlying platform services provided by the OS kernel space 108.

The kernel space 108 includes system-level commands and functions for executing various memory management routines and scheduling programs, for example. The ACPI namespace nodal tree 110 is stored within a database structure of the kernel space 108 and forms an integral part of the ACPI specification. As is well known, the ACPI namespace nodal tree 110 provides a hierarchical tree structure that contains a number of named objects including package objects which refer to other objects, data objects, control method objects, bus objects, or device objects, for example.

Operating System-directed Power Management (OSPM) code 112 provides instructions for executing a model of power and system management wherein the OS kernel space 108 plays a central role and uses global information to optimize platform behavior for the task at hand. A device driver 114 provides the necessary software components that permit communication with platform hardware devices 116 including components such as liquid crystal displays (LCD) panels, video adapters, integrated drive electronics (IDEs), CD-ROMs, hard disk controllers, and other ACPI-compatible hardware implementations that make up at least a portion of the computer platform 100. A BIOS/system firmware 118 offers a set of essential software routines that test the platform hardware devices 116 at startup, invoke the OS, and support the transfer of data among various platform hardware devices 116.

The OSPM code 112 uses an ACPI Driver/ACPI Machine Language (AML) interpreter 120 to execute procedures stored in a block of ACPI system description tables 122 which describe the interfaces to the platform hardware devices 116. Some descriptions in the ACPI system description tables 122 may limit the hardware that can be built. Most descriptions, however, allow the hardware to be built in variable ways and provide the necessary operation sequences required to make the hardware function. The ACPI system description tables 122 may contain definition blocks employing a byte-code type of language which is interpreted by the ACPI driver/AML interpreter 120. The definition blocks contain information about hardware implementation and configuration details in the form of data and control methods. At a minimum, the ACPI system description tables 122 of the computer platform 100 include what is known as a "differentiated definition block" which describes the base system. Typically, the ACPI system description tables 122 will include other definition blocks relating to power management structures, such as device power states, for example.

ACPI system firmware 124 provides code that boots the computer platform upon power-up and provides interfaces for sleep, wake, and restart operations. ACPI registers 126 are operable to store configuration constraints, parameters, etc. associated with the hardware interfaces that are described by the ACPI system description tables 122. Together, the ACPI system description tables 122, ACPI firmware 124, and ACPI registers 126 provide ACPI-interfaces that enable robust OSPM functionality intended for industry-wide adoption so as to encourage hardware and software vendors to build ACPI-compatible implementations. It should therefore be appreciated that the ACPI-defined interfaces, OSPM functionality and broader concepts defined therein are suitable to all classes of computers including desktops, mobiles, handhelds, appliance PCs, workstations, and server machines, for example.

Although a specific ACPI structure is presented in FIG. 1, it should be recognized that the structure may be modified to incorporate other ACPI-defined interfaces and appropriate hardware specifications that are particular to a certain design or computer platform. Moreover, the functionality of the blocks of FIG. 1 can be combined in any known fashion. For example, the functionalities of the BIOS/system firmware 118 and the ACPI firmware 124 may be combined. Additionally, the computer platform 100 may include an ACPI Access Layer (AAL) 128 as part of its kernel space 108 that wraps around the ACPI interfaces, and provides an extension of the kernel whereby a system of multi-threaded access to the ACPI namespace and control method objects can be effectuated. Moreover, the AAL may include the functionalities of the present invention described hereinbelow.

At run-time, the OS kernel space 108 dynamically changes the contents of the ACPI namespace nodal tree 110 by loading and/or unloading definition blocks from the ACPI system description tables 122. During operation, user applications access the ACPI namespace 110 with such frequency that providing the user-application space 102 with its own namespace 104, which is a redacted copy of the kernel space ACPI namespace 110, is more efficient than continually accessing the kernel's ACPI namespace.

Figure 2:
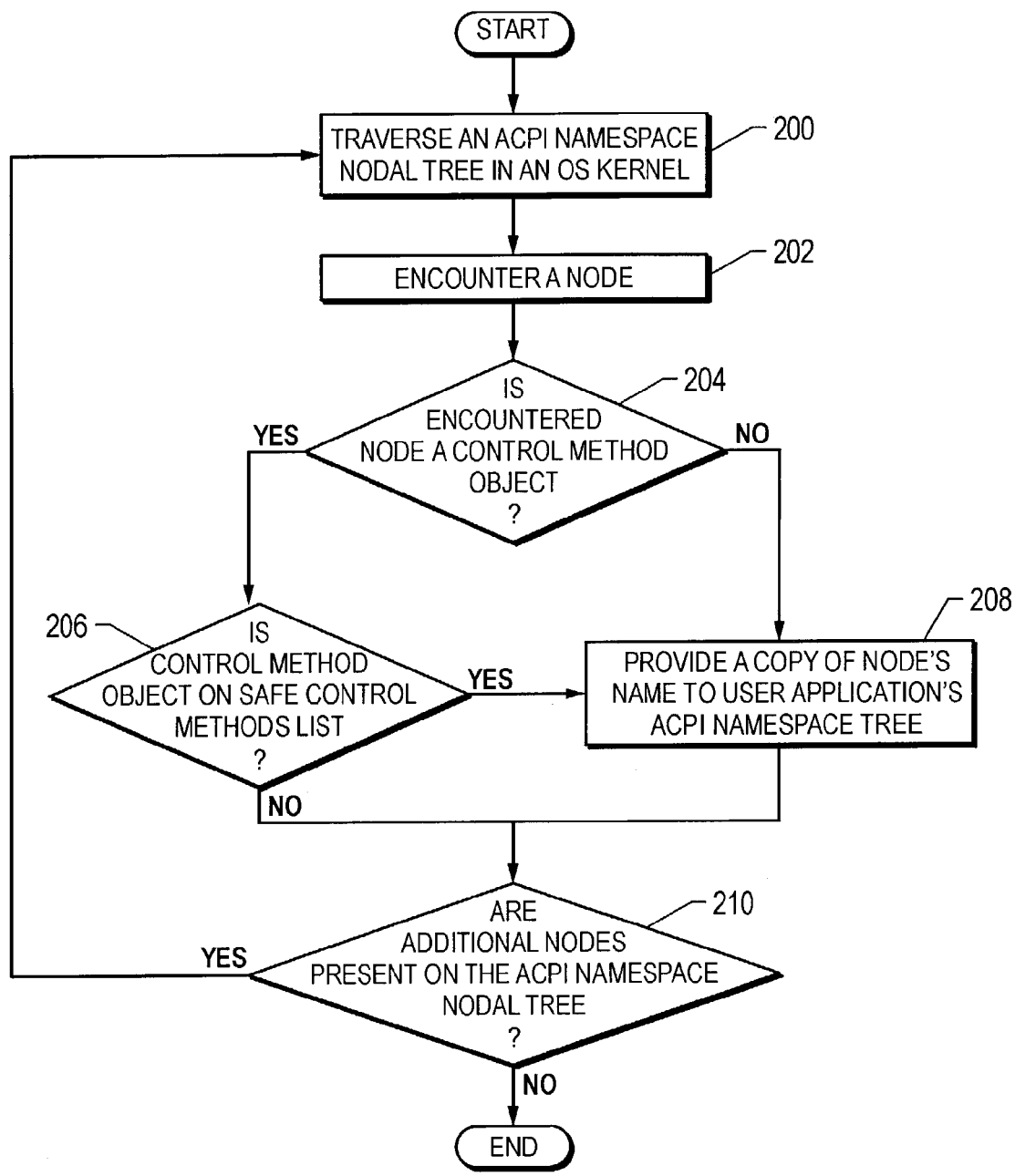
FIG. 2 depicts a flow chart illustrating a method for constructing a user application's ACPI namespace in an embodiment of the present invention.

FIG. 2 depicts a method for constructing a user application's ACPI namespace in a computer platform employing an ACPI-compatible implementation. At block 200, a traversing function traverses an ACPI namespace nodal tree of the computer platform's OS kernel. The traversing function may take the form of a function call such as Acpi_GetNextObject(parameters), for example. At block 202, the traversing function encounters a node of the kernel's ACPI namespace. At decision block 204, if the encountered node is a control method object, the operation advances to another decision block 206. Otherwise, the operation continues to block 208 wherein a copy of the node's name is passed to the user application space.

At decision block 206, if the control method object is on a safe control methods list then the process continues to block 208. As previously discussed, a control method object provides the definition of how the OS can perform various hardware tasks by interrogating and adjusting system-level hardware states. Therefore, control method objects may modify registers or be associated with General Purpose Events (GPEs) which affect generic features of the computer platform including value-added hardware. Accordingly, by censoring the user application's knowledge of control method objects through not copying certain control method objects into the user application's ACPI namespace tree, the stability of the computer platform is increased.

The traversing function may search the safe control methods list by calling a subroutine that takes the form of a function call such as AcpiGetType(parameters), for example. If the control method object is not on the safe control methods list, however, then a copy of the control method object is not provided and the process continues to decision block 210. The safe control methods list is a list stored in the kernel to provide functions, such as the traversing function, with a list of control method objects that are deemed "safe." In one embodiment, safe control method objects are those control method objects that only return data. In another embodiment, the safe control methods list includes control method objects that are not associated with, or otherwise avoid, GPEs. In a further embodiment, the safe control methods list includes control method objects that are deemed acceptable based on previous empirical testing, demonstrating that the particular control method objects do not panic the kernel or corrupt data. Also, the control methods list may include control method objects that do not cause hardware configuration changes. It should be appreciated, however, that other definitions of a "safe" control method object may also be used. As pointed out earlier, at decision block 208, the traversing function provides a copy of the node's name to the user application's ACPI namespace tree. At decision block 210, if additional nodes are present in the ACPI namespace nodal tree of the OS kernel, the process returns to block 200. If no additional nodes are present, however, the process ends.

Figure 3:
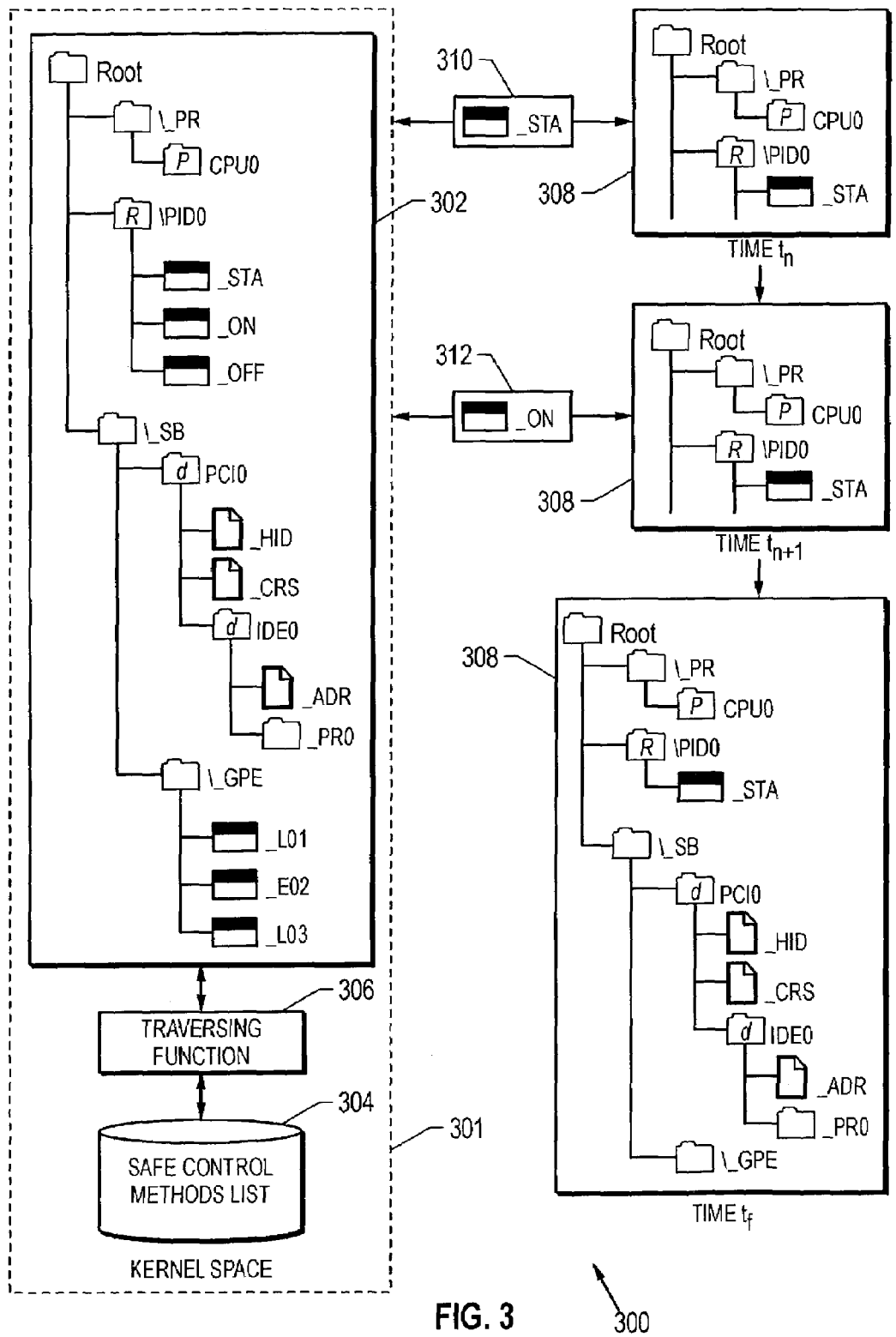
FIG. 3 depicts a schematic diagram of a system for constructing a user application's ACPI namespace in an embodiment of the present invention.

FIG. 3 depicts an embodiment of a system 300 for constructing a user application's ACPI namespace in a computer platform employing an ACPI-compatible implementation. Kernel space 301 includes an ACPI namespace nodal tree 302 having multiple nodes such as a control method object (_OFF) node or a data object device (_HID) node. Under the root directory (Root), the namespace nodal tree includes a processor tree package (\_PR), a system bus tree package (\_SB), and a GPE tree package (\_GPE). Each package refers to and contains a set of objects. For example, the processor tree package (\_PR) contains a processor object (CPU0) that contains data and instructions relating to a specific processor. The system bus tree package (\_SB) includes a PCI bus object (PCI0) having a sub-branch that includes a device identification data object (_HID), a current resource data object (_CRS), and an IDE device object (IDE0). Additionally, a device and function object (_ADR) and power resource requirements package (_PRO) are positioned in a further sub-branch of the IDE device object (IDE0). The general purpose tree package (\_GPE) includes three control method objects (_L01, _E02, _L03) that are executed in response to a GPE.

Additionally, three control method objects are located within a power resource object (\PID0). A status control method object (_STA) evaluates the state of the power resource and returns a value indicative of the state. A power control method object (_ON) sets the power resource ON. A power control method object (_OFF) sets the power resource OFF. It should be understood that the ACPI namespace nodal tree 302 is presented with a specific nodal construction by way of illustration only and, accordingly, the ACPI namespace nodal tree may have other nodal hierarchies.

A data structure 304 having a safe control methods list provides a list of the safe control method objects. In the illustrated system 300, the safe control methods list includes control method objects that return data and are not associated with GPEs. Accordingly, in the illustrated portion of the ACPI namespace nodal tree 302, the status control method object (_STA) is the only control method object found in the safe control methods list. A traversing function 306, which may be provided as a wrapper structure within the kernel's AAL, traverses the ACPI namespace nodal tree 302 and constructs a user application ACPI namespace tree 308, which is illustrated at three different times, $t_n$, $t_{n+1}$, and $t_f$. In one embodiment, the traversing function 306 traverses the ACPI namespace nodal tree 302 in a recursive depth-first fashion as the user application ACPI namespace tree 308 is constructed.

At time $t_n$, the traversing function 306 has provided copies of the root package (Root), processor tree package (\_PR), CPU processor object (CPU0), and processor resource object (\PID0) to the user space ACPI namespace tree 308. The traversing function 306 then encounters the status control method object (_STA) as illustrated by a function call structure 310. In response, the traversing function 306 searches the safe control methods list for the control method object (_STA). As discussed, the _STA object is a power resource object that evaluates and returns status only, i.e., the current ON or OFF state of the power resource. Therefore, the _STA object is found on the safe methods list, a copy of which is passed to the user application's ACPI namespace tree 308 when the function call is returned.

At time $t_{n+1}$, the traversing function 306 has completed copying the _STA object from the kernel's ACPI namespace nodal tree 302 into the user application's namespace tree 308. The traversing function then encounters the power control method object (_ON) as represented by another function call structure 312. As discussed, the _ON object is not on the safe methods list. Accordingly, a copy of the _ON object is not provided to the user application's namespace tree 308, i.e., the object's copy is withheld as indicated by the control method object's absence from the ACPI namespace tree 308 at time $t_{n+1}$.

At time $t_f$, the traversing function 306 has completed providing a copy of the appropriate nodes in the kernel's ACPI namespace nodal tree 302 to the user application space. The control method objects (_ON, _OFF, _L01, _E02, _L03) were not copied into the user application's ACPI namespace 308. Similar to the control method object (_ON), the control method object (_OFF) is a power resource object that does not return data. The control method objects (_L01, _E02, _L03) are associated with GPEs, and, as such, are not safe methods. Accordingly, the ACPI namespace nodal tree of the user application space comprises a redacted copy of the kernel's ACPI namespace. By censoring the names of the control method objects that are copied into the user application ACPI namespace tree, the present invention prevents a user application from potentially causing firmware changes that the kernel cannot handle, corrupt data, or crash the entire system. The system thereby provides a "read-only" copy of the ACPI namespace nodal tree (from the user application's standpoint) which contains potentially dangerous methods in the kernel space.

Figure 4:
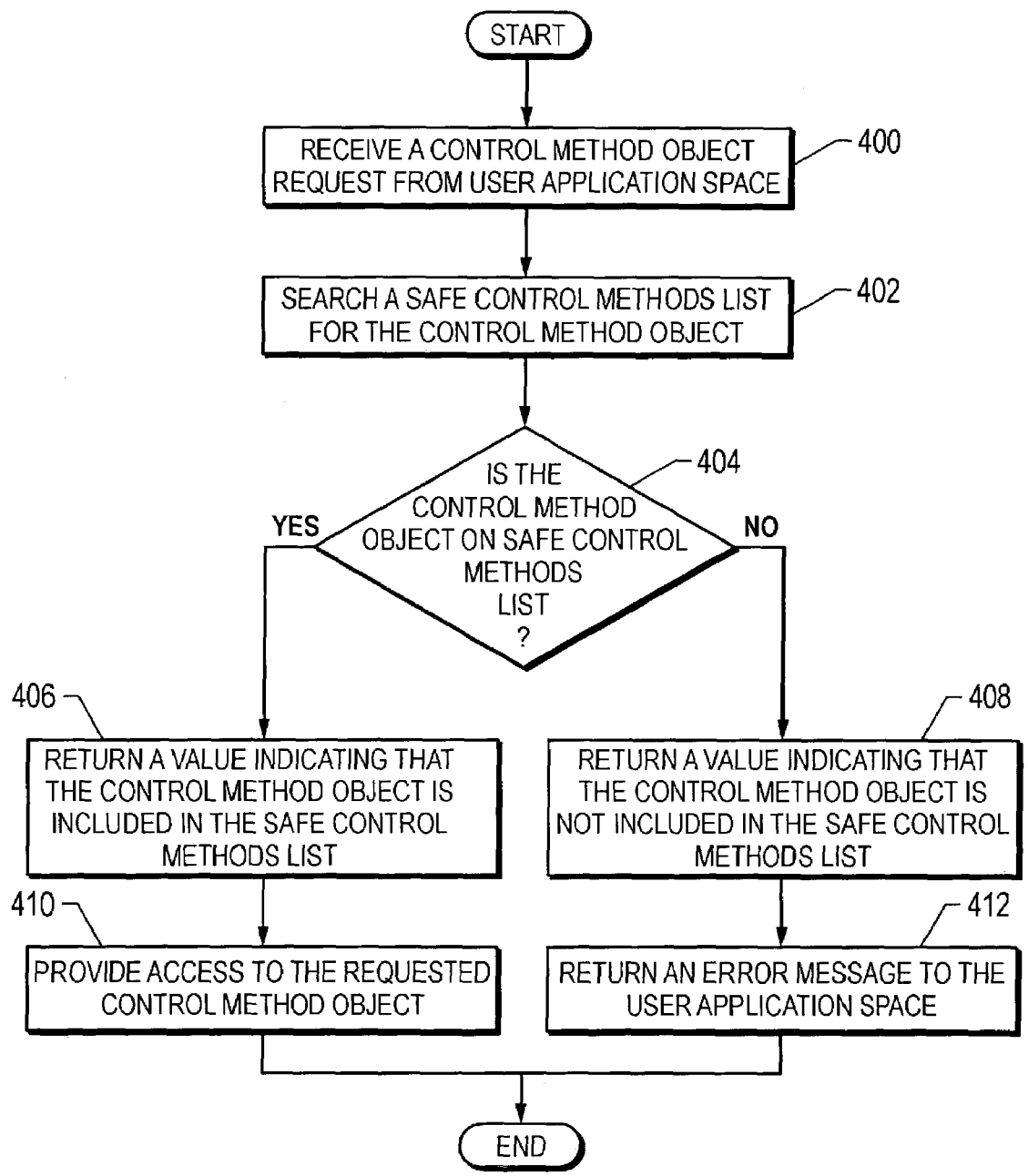
FIG. 4 depicts a flow chart illustrating a method for restricting a user application's access to a control method object in another embodiment of the present invention.

FIG. 4 depicts a method for restricting a user application's access to a control method object in a computer platform employing an ACPI compatible implementation. At block 400, the computer platform's kernel receives a control method object request from a user application space. At block 402, a function filter interface, which may be implemented as a component of the kernel's AAL, searches a safe control methods list for the requested control method object. The function filter interface may take the form of a function call such as AcpiEvaluateObject(parameters), for example. At decision block 404, if the control method object is on the safe control methods list, the method continues to block 406 where the function returns a value indicating that the control method object is included in the safe methods list. If the control method object is not on the safe control methods list, however, the method continues to block 408 where an appropriate value is likewise returned, indicating that the request is not included in the safe control methods list.

Thereafter, at block 410, access to the appropriate drivers and/or hardware devices is provided pursuant to the requested control method object. On the other hand, the function returns an error message to the user application space when the requested object is not in the safe methods list (block 412). By verifying that a control method object request may be safely executed, the filter interface function of the method prevents a user application from potentially invoking a control method object that may affect the stability of the computer platform.

Figure 5A:
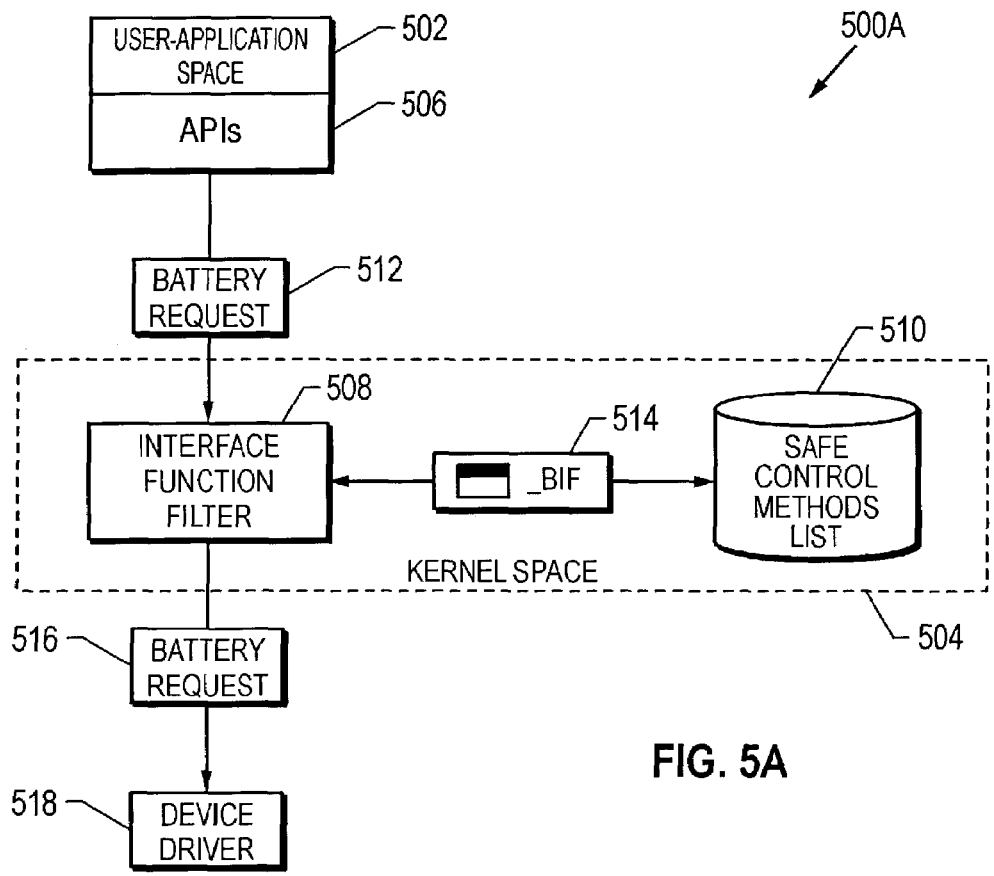
FIG. 5A depicts a schematic diagram of a system wherein the user application's access to a control method object is not restricted.

FIG. 5A depicts a schematic diagram of a system 500A wherein the user application's access to a control method object is not restricted. A user-application space 502 interfaces with kernel space 504 via APIs 506. An interface function filter 508 is operable to restrict a user application's access to a particular control method object if the particular control method object is not included in a list of safe control methods stored in a database structure 510. In the illustrated embodiment, the list of safe control methods includes only those control methods that return data. As illustrated, a control method object request 512 that requests battery information is sent from a user-space application to the interface function filter 508 located within the kernel space 504. The interface function filter 508 sends a "search and evaluate" request 514 to the safe control methods list in order to verify if the requested control method object (_BIF) is located therein. Since the _BIF object returns data relating to the status of the battery, it is included in the safe methods list. Accordingly, the interface function filter 508 passes a kernel space battery request 516 to an appropriate device driver 518 where the control method object may be executed.

Figure 5B:
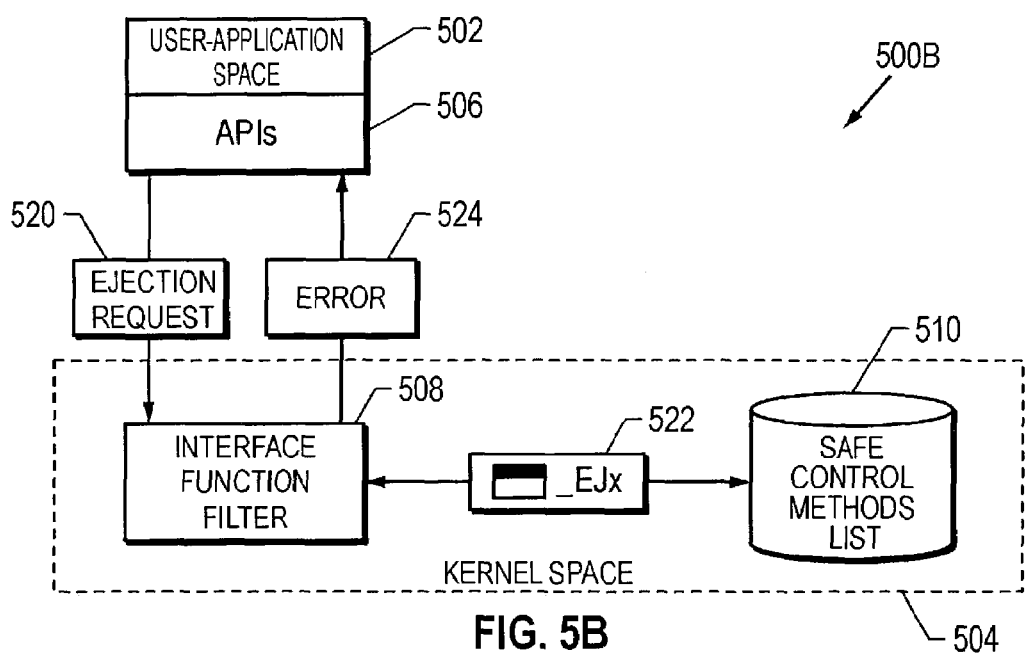
FIG. 5B depicts a schematic diagram of a system wherein the user application's access to a control method object is restricted.

FIG. 5B depicts a schematic diagram of a system 500B wherein the user application's access to a control method object is restricted. Similar to FIG. 5A, an application sends an ejection request 520 to a device driver via the interface function filter 508 in the kernel space 504. The ejection request control method object (_EJx) is an insertion/removal control method object that causes the ejection of a device. The interface function filter 508 searches the safe methods list 510 for the requested _EJx object by sending a search request 522 thereto. The _EJx object is not on the safe methods list since the method is operable to cause an action having system-wide repercussions. The interface function filter 508 accordingly returns an error message 524 to the user application to indicate that the requested _EJx object cannot be executed by the user application. It should therefore be appreciated that by denying access to "unsafe" methods, the interface function filter eliminates the risk of causing an undesirable event by a user application.

Although the invention has been particularly described with reference to certain illustrations, it is to be understood that the forms of the invention shown and described are to be treated as exemplary embodiments only. Various changes, substitutions and modifications can be realized without departing from the spirit and scope of the invention as defined by the appended claims.

What is claimed is:

1. A computer-implemented system for constructing a user application's Advanced Configuration and Power Interface (ACPI) namespace in a computer platform employing an ACPI-compatible implementation, comprising:
   a data structure operably associated with said computer platform, said data structure having a kernel ACPI namespace nodal tree including at least one node;
   a data structure having a list of safe control methods operably associated with said computer platform; and
   a traversing function wrapper structure associated with said computer platform that is operable to traverse said kernel ACPI namespace nodal tree and provide a copy of said at least one node to a database structure associated with said user application's ACPI namespace only when said at least one node is included in said list of safe control methods.

2. The computer-implemented system as recited in claim 1, wherein said list of safe control methods is stored in said computer platform's kernel space.

3. The computer-implemented system as recited in claim 1, wherein said list of safe control methods includes ACPI methods operable to return data only.

4. The computer-implemented system as recited in claim 1, wherein said list of safe control methods includes ACPI methods operable to avoid a General Purpose Event.

5. The computer-implemented system as recited in claim 1, wherein said traversing function wrapper structure is stored in said computer platform's kernel space.

6. The computer-implemented system as recited in claim 1, wherein said traversing function wrapper structure is operable to traverse said kernel ACPI namespace nodal tree in a recursive depth-first fashion.

7. The computer-implemented system as recited in claim 1, wherein said at least one node is selected from package objects, processor objects, power resource objects, bus objects, device objects, data objects, and control method objects.

8. A computer-implemented method for constructing a user application's Advanced Configuration and Power Interface (ACPI) namespace in a computer platform employing an ACPI-compatible implementation, comprising;
   traversing an ACPI namespace nodal tree in an OS kernel;
   upon encountering a node in said ACPI namespace nodal tree, determining if said node is a control method object;
   providing a copy of said node to a database structure associated with said user application's ACPI namespace if said node is not a control method object; and
   if said node is determined to be a control method object, providing a copy of said node to said database structure associated with said user application's ACPI namespace only when said node is on a list of safe control methods.

9. The method computer-implemented as recited in claim 8, wherein the operation of traversing an ACPI namespace nodal tree further comprises traversing said ACPI namespace nodal tree in a recursive depth-first fashion.

10. The computer-implemented method as recited in claim 8, wherein the operation of traversing said ACPI namespace nodal tree further comprises encountering node elements selected from package objects, processor objects, power resource objects, bus objects, data objects, and control method objects.

11. The computer-implemented method as recited in claim 8, wherein said list of safe control methods includes at least one control method object operable to return data only.

12. The computer-implemented method as recited in claim 8, wherein said list of safe control methods includes at least one control method object operable to avoid a General Purpose Event.

13. A computer-implemented system for constructing a user application's Advanced Configuration and Power Interface (ACPI) namespace in a computer platform employing an ACPI-compatible implementation, comprising:
   means for traversing an ACPI namespace nodal tree in an OS kernel;
   means for determining if said node is a control method object;
   means for providing a copy of said node to a database structure associated with said user application's ACPI namespace if said node is not a control method object; and
   means for providing a copy of said node to said database structure associated with said user application's ACPI namespace only when said node is determined to be a control method object and said node is on a list of safe control methods.

14. A computer-readable medium operable with a computer platform to construct a user application's Advanced Configuration and Power Interface (ACPI) namespace in a computer platform employing an ACPI-compatible implementation, the medium having stored thereon:
   instructions for traversing an ACPI namespace nodal tree in an OS kernel;
   instructions for determining if said node is a control method object;
   instructions for providing a copy of said node to a database structure associated with said user application's ACPI namespace if said node is not a control method object; and
   instructions for providing a copy of said node to said database structure associated with said user application's ACPI namespace only when said node is on a list of safe control methods.

* * * * *

UNITED STATES PATENT AND TRADEMARK OFFICE
CERTIFICATE OF CORRECTION

| | |
|---|---|
| PATENT NO. | : 7,197,631 B1 |
| APPLICATION NO. | : 10/329198 |
| DATED | : March 27, 2007 |
| INVENTOR(S) | : Matthew Fischer et al. |

It is certified that error appears in the above-identified patent and that said Letters Patent is hereby corrected as shown below:

In column 7, line 61, in Claim 8, delete "comprising;" and insert -- comprising: --, therefor.

In column 8, line 10, in Claim 9, delete "The method computer-implemented" and insert -- The computer-implemented method --, therefor.

Signed and Sealed this

Ninth Day of September, 2008

JON W. DUDAS
*Director of the United States Patent and Trademark Office*